(12) United States Patent
Mcmynn et al.

(10) Patent No.: US 12,147,533 B2
(45) Date of Patent: Nov. 19, 2024

(54) SECURELY BROKERING ACCESS TOKENS TO PARTIALLY TRUSTED CODE

(71) Applicant: MICROSOFT TECHNOLOGY LICENSING, LLC, Redmond, WA (US)

(72) Inventors: Graham Lee Mcmynn, Redmond, WA (US); Patrick Carl Miller, Sammamish, WA (US); Luca Bandinelli, Sammamish, WA (US); John Giang Nguyen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 172 days.

(21) Appl. No.: 17/897,109

(22) Filed: Aug. 26, 2022

(65) Prior Publication Data
US 2024/0037220 A1 Feb. 1, 2024

Related U.S. Application Data

(60) Provisional application No. 63/393,950, filed on Jul. 31, 2022.

(51) Int. Cl.
*G06F 21/54* (2013.01)
(52) U.S. Cl.
CPC ........ *G06F 21/54* (2013.01); *G06F 2221/033* (2013.01)
(58) Field of Classification Search
CPC ............................ G06F 21/54; G06F 2221/033
See application file for complete search history.

(56) References Cited

U.S. PATENT DOCUMENTS 8,347,083 B1 * 1/2013 Scudder .............. H04L 63/0435
713/159
9,015,820 B1 * 4/2015 Bhosle .................. H04L 9/3213
713/172

(Continued)

OTHER PUBLICATIONS

Georgiev, Martin, Suman Jana, and Vitaly Shmatikov. "Breaking and fixing origin-based access control in hybrid web/mobile application frameworks." NDSS symposium. vol. 2014. NIH Public Access, 2014.*

(Continued)

*Primary Examiner* — Jimmy H Tran
(74) *Attorney, Agent, or Firm* — Newport IP, LLC; Jacob P. Rohwer

(57) ABSTRACT

An access token broker is executed within a first iFrame, a fully trusted application is executed in a second iFrame within the first iFrame, and a partially trusted application is executed in a third iFrame within the second iFrame. The partially trusted application may identify the iFrame in which the access token broker is executing and request an access token from the access token broker. The access token broker determines whether the request for the access token is to be granted. If the request is to be granted, the access token broker requests the access token from a hosting application. The hosting application obtains the requested access token from an access token server and provides the access token to the access token broker. The access token broker receives the access token from the hosting application and provides the access token to the partially trusted application.

20 Claims, 9 Drawing Sheets

(56) References Cited

U.S. PATENT DOCUMENTS

| | | | |
|---|---|---|---|
| 10,484,357 B1* | 11/2019 | Jain | H04L 63/0815 |
| 10,742,659 B1* | 8/2020 | Roka | H04L 63/0884 |
| 11,005,853 B1* | 5/2021 | Agarwal | H04L 63/0807 |
| 2007/0299857 A1* | 12/2007 | Gwozdz | G06F 16/957 |
| | | | 707/999.102 |
| 2007/0300057 A1* | 12/2007 | Corcoran | H04L 9/3234 |
| | | | 713/154 |
| 2010/0257578 A1* | 10/2010 | Shukla | G06F 21/6218 |
| | | | 726/1 |
| 2010/0274910 A1* | 10/2010 | Ghanaie-Sichanie | |
| | | | H04L 63/08 |
| | | | 709/229 |
| 2012/0173868 A1* | 7/2012 | Isaacs | G06F 16/957 |
| | | | 713/150 |
| 2013/0191880 A1* | 7/2013 | Conlan | H04L 67/34 |
| | | | 726/1 |
| 2013/0347070 A1* | 12/2013 | Cairns | H04W 4/60 |
| | | | 726/3 |
| 2015/0106915 A1* | 4/2015 | Abraham | G06F 21/53 |
| | | | 726/16 |
| 2015/0242256 A1* | 8/2015 | Morrissey | H04L 67/02 |
| | | | 709/219 |
| 2015/0341347 A1* | 11/2015 | Kong | H04L 63/0853 |
| | | | 726/4 |
| 2016/0028694 A1* | 1/2016 | Islam | G06F 21/6218 |
| | | | 726/12 |
| 2016/0277421 A1* | 9/2016 | Lahoz | G06Q 20/3821 |
| 2017/0244696 A1* | 8/2017 | Lund | H04L 63/10 |
| 2018/0109539 A1* | 4/2018 | Enoki | H04L 63/0407 |
| 2018/0191735 A1* | 7/2018 | Lahoz | H04L 63/102 |
| 2019/0123924 A1* | 4/2019 | Embiricos | H04L 12/1813 |
| 2019/0238615 A1* | 8/2019 | Freedman | H04L 67/02 |
| 2019/0281058 A1* | 9/2019 | Enoki | H04L 63/10 |
| 2020/0019584 A1* | 1/2020 | Ross | G06F 16/00 |
| 2020/0028848 A1* | 1/2020 | Gupta | G06F 21/105 |
| 2020/0336310 A1* | 10/2020 | Jain | H04L 63/105 |
| 2020/0364354 A1* | 11/2020 | Schwartz | G06F 21/604 |
| 2021/0084038 A1* | 3/2021 | Feasel | G06F 21/629 |
| 2021/0385217 A1* | 12/2021 | Benko | H04L 63/0815 |
| 2022/0417021 A1* | 12/2022 | Singhal | H04L 9/3226 |
| 2022/0417233 A1* | 12/2022 | Singhal | H04L 63/0807 |
| 2023/0004637 A1* | 1/2023 | Wang | G06F 21/53 |
| 2023/0297357 A1* | 9/2023 | Zemla | G06F 8/62 |
| | | | 717/175 |
| 2023/0353546 A1* | 11/2023 | Barnett | H04L 63/0428 |

OTHER PUBLICATIONS

White, et al., "Securely Embed Content on your Site", Retrieved from: https://developer.chrome.com/blog/embed-content/, Apr. 13, 2022, 6 Pages.

"International Search Report and Written Opinion Issued in PCT Application No. PCT/US23/025497", Mailed Date: Oct. 30, 2023, 12 Pages.

* cited by examiner

SECURELY BROKERING ACCESS TOKENS TO PARTIALLY TRUSTED CODE

CROSS-REFERENCE TO RELATED APPLICATIONS

This application claims the benefit of U.S. Provisional Patent Application No. 63/393,950, entitled "Securely Brokering Access Tokens to Partially Trusted Code," which was filed on Jul. 31, 2022, and which is expressly incorporated herein by reference in its entirety.

BACKGROUND

Some types of application programs may utilize both fully trusted and partially trusted or untrusted code. For example, a fully trusted application might be extensible through the use of partially trusted or untrusted third-party extensions that are embedded using a HyperText Markup Language ("HTML") inline frame element (an "iFrame"). The fully trusted application and the partially trusted or untrusted third-party extensions may originate from the same domain.

When a fully trusted application configured in the manner described above is hosted from within another application (a "hosting application"), the fully trusted application and any partially trusted or untrusted third-party extensions may request resource access tokens from the hosting application in order to gain authorization to utilize different network resources. Because the hosting application trusts the fully trusted application, the hosting application also fully trusts any partially trusted or untrusted third-party extensions embedded by the fully trusted application.

Consequently, the hosting application may provide access tokens to partially trusted or untrusted third-party extensions embedded within a fully trusted application for resources that the partially trusted or untrusted third-party extensions do not have access rights to. This represents an escalation of privileges for partially trusted or untrusted third-party code that might jeopardize the security of a computing system executing the hosting application.

It is with respect to these and other technical challenges that the disclosure made herein is presented.

SUMMARY

Technologies are disclosed herein for securely brokering access tokens to partially trusted or untrusted code. Through implementations of the disclosed technologies, access tokens can be securely provided to hosted applications that utilize both fully trusted and partially trusted or untrusted code. This can eliminate the possibility of privilege escalation for hosted partially trusted or untrusted code and, thereby, can improve the security of computing systems implementing the disclosed technologies. Other technical benefits not specifically mentioned herein can also be realized through implementations of the disclosed subject matter.

According to various embodiments, a hosting application hosts a fully trusted application that is extensible through the use of partially trusted or untrusted code (referred to herein as a "partially trusted application" or "partially trusted code"). For example, the fully trusted application might be extensible through the use of partially trusted or untrusted third-party extensions that are embedded using an iFrame. Both the fully trusted application and the partially trusted application can generate requests for access tokens for use in accessing network resources.

In order to provide access tokens in a secure manner, an access token broker is executed within a first iFrame, the fully trusted application is executed in a second iFrame within the first iFrame, and the partially trusted application is executed in a third iFrame within the second iFrame. The first iFrame is associated with a first origin and the second and third iFrames are associated with origins that are different than the first origin.

In order to request access tokens, the fully trusted application or the partially trusted application may first identify the iFrame in which the access token broker is executing. To do this, the fully trusted application or the partially trusted application may transmit broker identification messages to each of the other iFrames. The broker identification messages are transmitted using the JAVASCRIPT postMessage method in some embodiments. A response to the broker identification messages will only be received from the iFrame in which the access token broker is executing.

Once the iFrame executing the access token broker has been identified, the fully trusted application or the partially trusted application may then request an access token by transmitting an access token request to the access token broker. The access token request is transmitted using the JAVASCRIPT postMessage method in some embodiments.

When the access token broker receives an access token request, the access token broker determines whether the request for the access token is to be granted. For example, and without limitation, in some embodiments the access token broker determines whether the access token request is for an access token for an origin that is the same as the origin of the iFrame from which the request was received. If the access token request is for an access token for a different origin than the origin of the iFrame from which the request was received, the access token broker will deny the access token request.

If the access token broker determines that the access token request is for an access token for an origin that is the same as the origin of the iFrame from which the request was received, the access token broker will request the access token from the hosting application. The access token broker requests the access token from the hosting application using the JAVASCRIPT postMessage method in some embodiments. The hosting application, in turn, obtains the requested access token from an access token server and provides the access token to the access token broker.

The access token broker receives the access token from the hosting application and provides the access token to the requesting application (i.e., the fully trusted application or the partially trusted application) in response to the access token request. The access token broker provides the access token to the requesting application using the JAVASCRIPT postMessage method in some embodiments.

In one embodiment, the hosting application is a conferencing application that provides functionality for enabling users to participate in audio and/or video conferencing sessions and the fully trusted application and partially trusted application are a collaboration application that provides functionality for enabling users to create, share, and collaborate on documents. In this regard, it is to be appreciated that the hosting application and the fully trusted and partially trusted applications might be other types of applications in other embodiments.

As discussed briefly above, implementations of the technologies disclosed herein provide various technical benefits such as, but not limited to, improving the security of computing devices implementing aspects of the disclosed subject matter. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
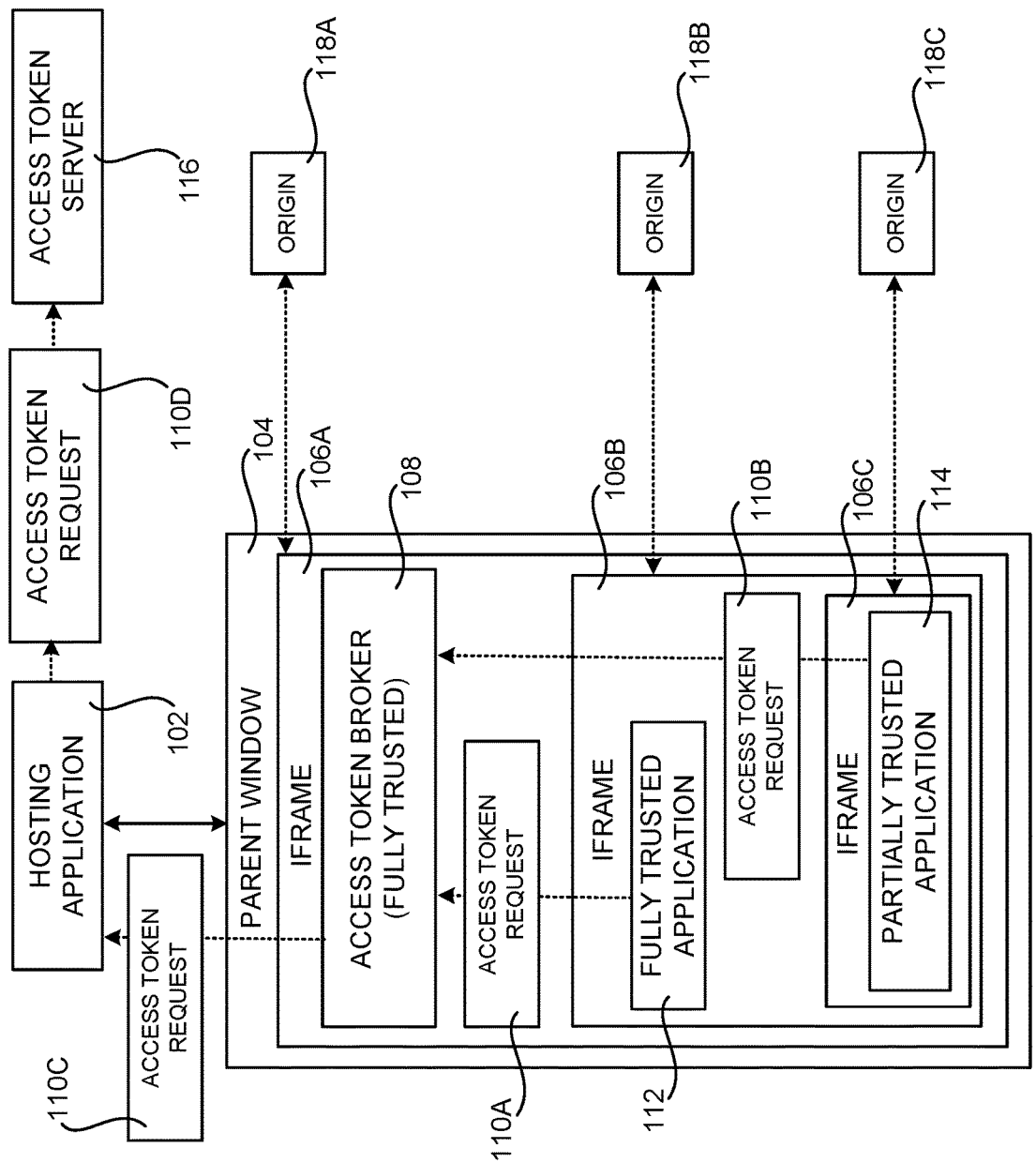
FIG. 1A is a network and computing system architecture diagram showing aspects of a mechanism disclosed herein for securely brokering access tokens to partially trusted code, according to one embodiment disclosed herein.

The following detailed description is directed to technologies for securely brokering access tokens to partially trusted code. As discussed briefly above, various technical benefits can be realized through implementations of the disclosed technologies such as, but not limited to, improved security for computing devices implementing the disclosed subject matter. Other technical benefits not specifically mentioned herein can also be realized through implementations of the disclosed subject matter.

While the subject matter described herein is presented in the general context of computing devices that execute an application that hosts fully trusted code and partially trusted or untrusted code, those skilled in the art will recognize that other implementations can be performed in combination with other types of computing devices, systems, and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation, etc.), mini-computers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for securely brokering access tokens to partially trusted code will be described.

Figure 1B:
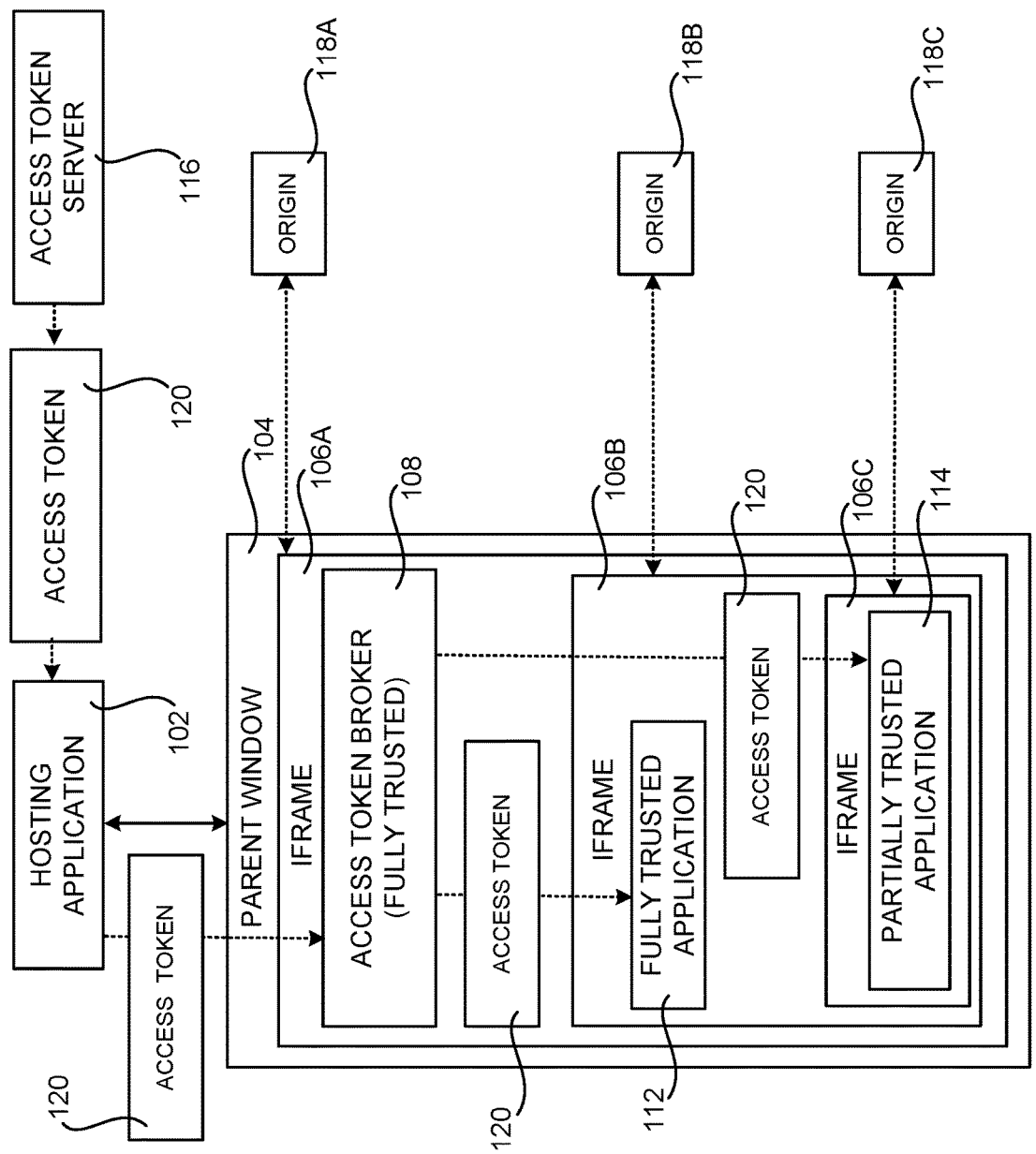
FIG. 1B is a network and computing system architecture diagram showing additional aspects of the mechanism shown in FIG. 1A for securely brokering access tokens to partially trusted code, according to one embodiment disclosed herein.

FIGS. 1A and 1B are network and computing system architecture diagrams showing aspects of a mechanism disclosed herein for securely brokering access tokens to partially trusted code, according to one embodiment disclosed herein. As discussed above, some types of application programs may utilize both fully trusted and partially trusted or untrusted code. For example, a fully trusted application might be extensible through the use of partially trusted or untrusted third-party extensions using iFrames. The fully trusted application and the partially trusted or untrusted third-party extensions may originate from the same domains in these configurations.

When a fully trusted application configured in the manner described above is hosted from within another application (a "hosting application"), the fully trusted application and any partially trusted or untrusted third-party extensions may request resource access tokens from the hosting application in order to gain authorization to utilize different network resources. Because the hosting application trusts the fully trusted application, the hosting application also fully trusts any partially trusted or untrusted third-party extensions embedded by the fully trusted application.

Consequently, the hosting application may provide access tokens to partially trusted or untrusted third-party extensions embedded within a fully trusted application for resources that the partially trusted or untrusted third-party extensions do not otherwise have access rights to. This represents an escalation of privileges for partially trusted or untrusted third-party code that might jeopardize the security of a computing system executing the hosting application.

In order to address the technical problem described above, and potentially others, a hosting application 102 hosts a fully trusted application 112 that is extensible through the use of partially trusted or untrusted code (referred to herein as a "partially trusted application 114" or "partially trusted code"). For example, the fully trusted application 112 might be extensible through the use of partially trusted or untrusted third-party extensions that are embedded using iFrames. As discussed above, both the fully trusted application 112 and the partially trusted application 114 can generate requests for access tokens for use in accessing network resources.

In order to provide access tokens to the partially trusted application 114 and the fully trusted application 112 in a secure manner, an access token broker 108 is executed within a first iFrame 106A. As known to those skilled in the art, an HTML iFrame element instructs a web browser to load a different, embedded, web page inside a specified rectangle appearing on the outer, or host, web page. The web page embedded inside an iFrame is mostly isolated from the host web page. For example, program scripts from an embedded web page are generally prohibited from communicating with scripts from a host page, thereby enforcing security in situations where the embedded web page may not be trusted.

As shown in FIG. 1A, the iFrame 106A may be hosted in a parent window 104 generated by the hosting application 102. As also shown in FIG. 1A, the iFrame 106A is associated with a first origin 118A. An origin refers to a uniform resource identifier ("URI") scheme/protocol (e.g., HTTP and HTTPS), an origin domain (e.g., contoso.sharepoint.com), and a port number (e.g., port 80).

As further shown in FIG. 1A, the fully trusted application 112 is executed in a second iFrame 106B within the first iFrame 106A. The partially trusted application 114 is executed in a third iFrame 106C within the second iFrame 106B. The second iFrame 106B and the third iFrame 106C are associated with origins 118B and 118C, respectively, that are different from one another and the first origin 118C.

In order to request access tokens, the fully trusted application 112 or the partially trusted application 114 may first identify the iFrame 106A in which the access token broker 108 is executing. To do this, the fully trusted application 112 or the partially trusted application 114 may transmit broker identification messages (not shown in FIG. 1A) to each of the other iFrames. For example, and without limitation, in order to identify the iFrame containing the access token broker 108, the partially trusted application 114 might transmit broker identification messages to the iFrame 106B, the iFrame 106A, and to the hosting application 102. The broker identification messages are transmitted using the JAVASCRIPT postMessage method in some embodiments. A response to the broker identification messages will only be received from the iFrame in which the access token broker 108 is executing.

Once the iFrame 106A executing the access token broker 108 has been identified, the fully trusted application 112 or the partially trusted application 114 may then request an access token by transmitting an access token request 110A or 1101B, respectively, to the access token broker 108. The access token request 110 is transmitted using the JAVASCRIPT postMessage method in some embodiments.

When the access token broker 108 receives an access token request 110, the access token broker 108 determines whether the request for the access token is to be granted. For example, and without limitation, in some embodiments the access token broker 108 determines whether the access token request 110 is for an access token for an origin that is the same as the origin 118 of the iFrame 106 from which the access token request 110 was received.

If the access token request 110 is for an access token for a different origin than the origin 118 of the iFrame 106 from which the request 110 was received, the access token broker 108 will deny the access token request. For instance, if the iFrame 106C is associated with an origin 118C, the access token broker 108 will deny any access token request 110B received from the partially trusted application 114 for a resource that has an origin that is different from the origin 118C associated with the iFrame 106C.

If the access token broker 108 determines that a received access token request 110 is for an access token for an origin that is the same as the origin 118 of the iFrame 106 from which the access token request 110 was received, the access token broker 108 will request the access token from the hosting application 102. The access token broker 108 requests the access token from the hosting application 102 by transmitting an access token request 110C using the JAVSACRIPT postMessage method in some embodiments. The hosting application 102, in turn, transmits an access token request 110D to an access token server 116 to obtain the requested access token 120 (shown in FIG. 1B). The hosting application 102 then provides the access token 120 to the access token broker 108 in response to the original request 110.

The access token broker 108 receives the access token 120 from the hosting application 120 and provides the access token 120 to the requesting application (i.e., the fully trusted application 112 or the partially trusted application 114) in response to the original access token request 110. The access token broker 108 provides the access token 120 to the requesting application 112 or 114 using the JAVASCRIPT postMessage method in some embodiments. The requesting application 112 or 114 can then utilize the access token 120 to access a network resource.

In one embodiment, the hosting application 102 is a conferencing application that provides functionality for enabling users to participate in audio and/or video conferencing sessions and the fully trusted application 112 and partially trusted application 114 together form a collaboration application that provides functionality for enabling users to create, share, and collaborate on documents. In this regard, it is to be appreciated that the hosting application 102 and the fully trusted and partially trusted applications 112 and 114, respectively, might be other types of applications in other embodiments.

Figure 1C:
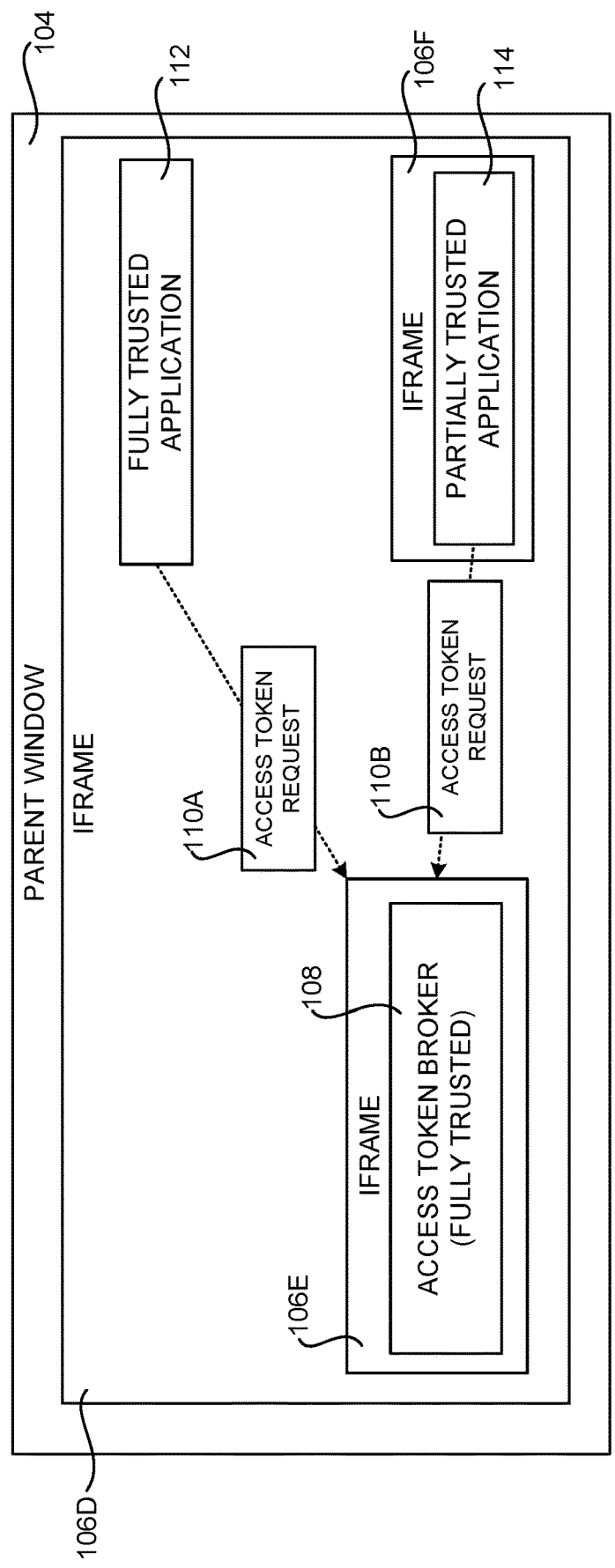
FIG. 1C is a network and computing system architecture diagram showing another configuration for a mechanism for securely brokering access tokens to partially trusted code, according to one embodiment disclosed herein.

FIG. 1C is a network and computing system architecture diagram showing another configuration for a mechanism for securely brokering access tokens 120 to partially trusted code, according to one embodiment disclosed herein. The configuration shown in FIG. 1C may be utilized when no hosting application 102 is present (e.g., a pure web-based implementation of the fully trusted application 112 and the partially trusted application 114).

In the embodiment illustrated in FIG. 1C, the parent window 104 hosts an iFrame 106D. The fully trusted application 112 executes within the iFrame 106D. The iFrame 106D also has iFrames 106E and 106F embedded therein. The access token broker 108 executes within the iFrame 106E and the partially trusted application 114 executes within the iFrame 106F.

The fully trusted application 112 and the partially trusted application 114 may make access token requests 110A and 110B, respectively, to the access token broker 108 in the manner described above. In this embodiment, however, the access token broker 108 can make requests for access tokens 120 directly to the access token server 116.

Figure 2A:
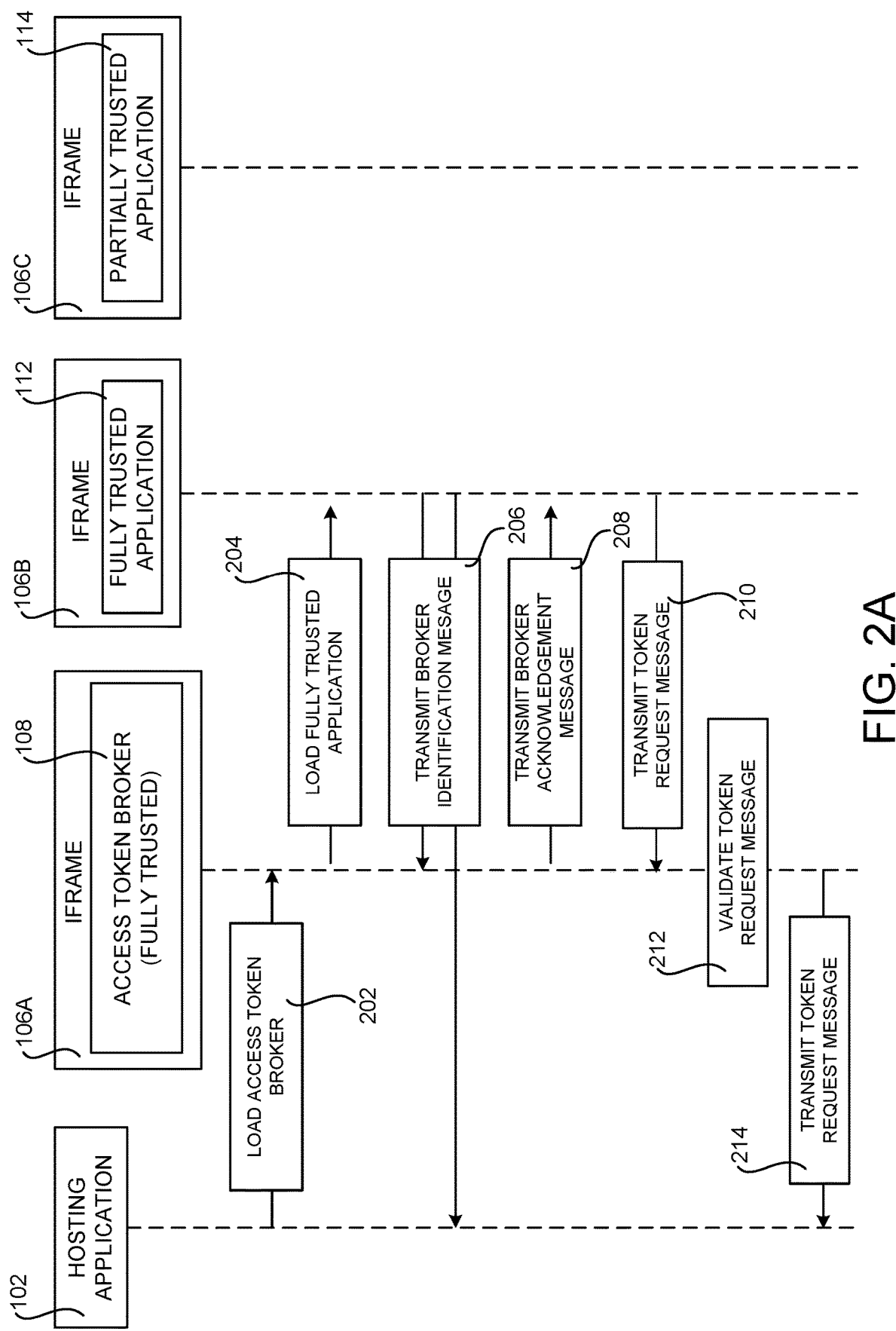
FIG. 2A is a timing diagram illustrating additional aspects of operation of the mechanism shown in FIGS. 1A and 1B for securely brokering access tokens to partially trusted code, according to one embodiment disclosed herein.
Figure 2B:
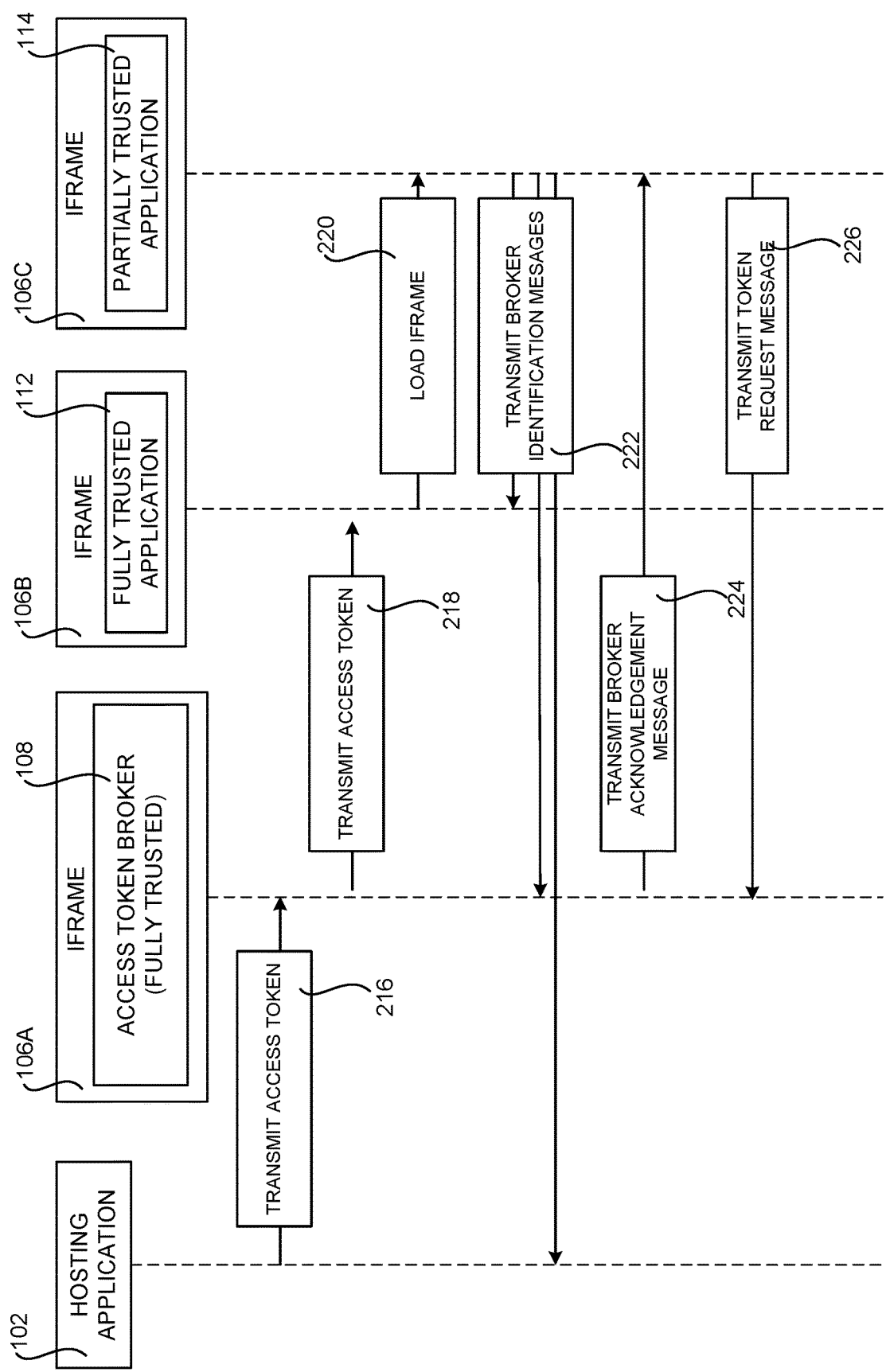
FIG. 2B is a timing diagram illustrating additional aspects of the operation of the mechanism shown in FIGS. 1A and 1B for securely brokering access tokens to partially trusted code, according to one embodiment disclosed herein.
Figure 2C:
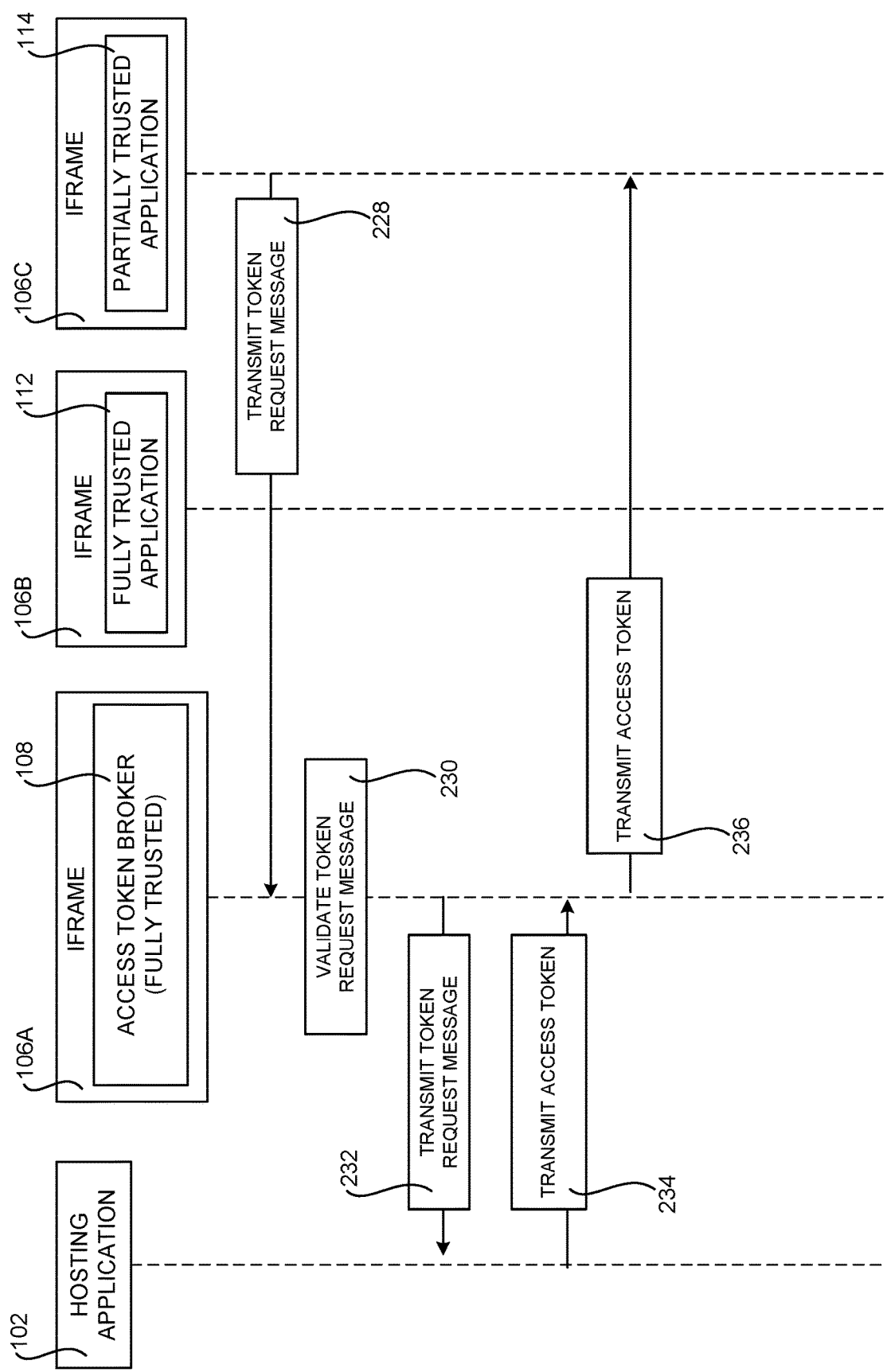
FIG. 2C is a is a timing diagram illustrating additional aspects of operation of the mechanism shown in FIGS. 1A and 1B for securely brokering access tokens to partially trusted code, according to one embodiment disclosed herein.

FIGS. 2A-2C are timing diagrams illustrating additional aspects of operation of the mechanism shown in FIGS. 1A and 1B for securely brokering access tokens 120 to partially trusted code, such as the partially trusted application 114, according to one embodiment disclosed herein. As shown in FIG. 2A, the access token broker 108 is loaded into the iFrame 106A at operation 202. The fully trusted application 112 is then loaded into the iFrame 106B at operation 204.

At operation 206, the fully trusted application 112 transmits a broker identification message to both the iFrame 106A and the hosting application 102. As discussed above, a response to the broker identification message will only be received from the iFrame in which the access token broker 108 is executing, in this case the iFrame 106A. This occurs at operation 208, where the access token broker 108 transmits a broker acknowledgement message to the fully trusted application 112. As discussed above, the broker identification message and the broker acknowledgement message are transmitting between the iFrames 106A and 106B using the JAVASCRIPT postMessage method in some embodiments Once the fully trusted application 112 has identified the iFrame 106A executing the access token broker 108, the fully trusted application 112 may transmit an access token request 110 to the access token broker 108 at operation 210. The access token broker 108 receives the access token request 110 and validates the access token request 110 at operation 212. As discussed above, in some embodiments the access token broker 108 validates the request 110 by determining whether the received request 110 is for an access token 120 for an origin that is the same as the origin 118 of the iFrame 106 from which the access token request 110 was received (i.e., the iFrame 106B in the illustrated embodiment).

If the access token request 110 is for an access token 120 for a different origin than the origin 118 of the iFrame 106A from which the request 110 was received, the access token broker 108 will deny the access token request. If the access token broker 108 determines that a received access token request 110 is for an access token for an origin that is the same as the origin 118 of the iFrame 106A from which the access token request 110 was received, the access token broker 108 requests the access token 120 from the hosting application 102 at operation 214. As discussed above, the access token broker 108 requests the access token 120 from the hosting application 102 by transmitting an access token request 110C using the JAVSACRIPT postMessage method in some embodiments.

The hosting application 102, in turn, transmits an access token request 110D to the access token server 116 to obtain the requested access token 120 (shown in FIG. 1B). The hosting application 102 then provides the access token 120 to the access token broker 108 in response to the original request 110 at operation 216. The access token broker 108 receives the access token 120 from the hosting application 120 and provides the access token 120 to the fully trusted application 112 at operation 218. As discussed above, the access token broker 108 provides the access token 120 to the fully trusted application 112 using the JAVASCRIPT postMessage method in some embodiments. The fully trusted application 112 can then utilize the access token 120 to access a network resource.

As discussed above, the fully trusted application 112 is extensible through the use of one or more partially trusted applications 114. For example, the fully trusted application 112 might be extensible through the use of partially trusted or untrusted third-party extensions that are embedded using an iFrame. In order to provide this functionality, the fully trusted application 112 can load an iFrame 106C and execute the partially trusted application 114 in the iFrame 106C. Although only a single iFrame 106C and a single partially trusted application 114 are shown in the FIGS., the trust application 112 might load more partially trusted applications 114 in additional iFrames 106 in other embodiments.

In order to obtain an access token 120 for a network resource, the partially trusted application 114 transmits a broker identification message to the iFrame 106A, the iFrame 106B, and the hosting application 102 at operation 222. As discussed above, a response to the broker identification message will only be received from the iFrame in which the access token broker 108 is executing, in this case the iFrame 106A. This occurs at operation 224, where the access token broker 108 transmits a broker acknowledgement message to the partially trusted application 114. As discussed above, the broker identification message and the broker acknowledgement message are transmitting between the iFrames 106A and 106C using the JAVASCRIPT postMessage method in some embodiments.

Once the partially trusted application 114 has identified the iFrame 106A executing the access token broker 108, the partially trusted application 114 may transmit an access token request 110 to the access token broker 108 at operation 226. The access token broker 108 receives the access token request 110 from the partially trusted application 114 and validates the access token request 110 at operation 230. As discussed above, in some embodiments the access token broker 108 determines whether the received access token request 110 is for an access token 120 for an origin that is the same as the origin 118 of the iFrame 106 from which the access token request 110 was received (i.e., the iFrame 106C in the illustrated embodiment).

If the access token request 110 is for an access token 120 for a different origin than the origin 118 of the iFrame from which the request 110 was received (i.e., the iFrame 106C in the illustrated embodiment), the access token broker 108 will deny the access token request 110. If the access token broker 108 determines that a received access token request 110 is for an access token 120 for an origin that is the same as the origin 118 of the iFrame from which the access token request 110 was received, the access token broker 108 requests the access token 120 from the hosting application 102 at operation 232. As discussed above, the access token broker 108 requests the access token 120 from the hosting application 102 by transmitting an access token request 110C using the JAVSACRIPT postMessage method in some embodiments.

The hosting application 102, in turn, transmits an access token request 110D to the access token server 116 to obtain the requested access token 120 (shown in FIG. 1B). The hosting application 102 then provides the access token 120 to the access token broker 108 in response to the original request 110 at operation 234. The access token broker 108 receives the access token 120 from the hosting application 102 and provides the access token 120 to the partially trusted application 114 at operation 236. As discussed above, the access token broker 108 provides the access token 120 to the partially trusted application 114 using the JAVASCRIPT postMessage method in some embodiments. The partially trusted application 114 can then utilize the received access token 120 to access a network resource.

Figure 3:
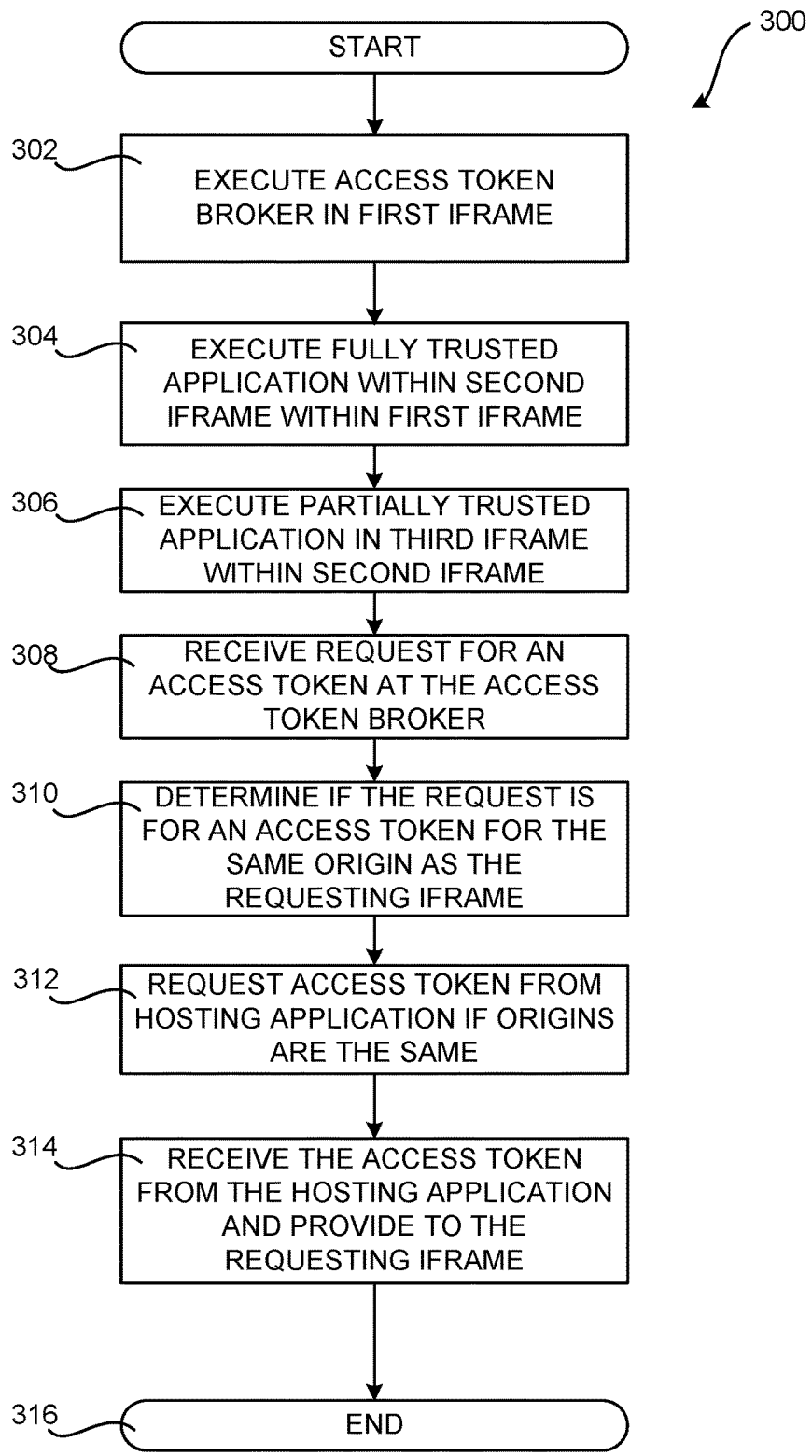
FIG. 3 is a flow diagram showing a routine that illustrates additional aspects of the mechanism shown in FIGS. 1A-2C for securely brokering access tokens to partially trusted code, according to one embodiment disclosed herein.

FIG. 3 is a flow diagram showing a routine that illustrates additional aspects of the mechanism shown in FIGS. 1A-2C for securely brokering access tokens 120 to partially trusted code, such as the partially trusted application 114, according to one embodiment disclosed herein. It is to be appreciated that the operations of the routines and methods disclosed herein are not presented in any particular order and that performance of some or all of the operations in an alternative order, or orders, is possible and is contemplated. The operations have been presented in the demonstrated order for ease of description and illustration. Operations may be added, omitted, and/or performed simultaneously, without departing from the scope of the appended claims. The illustrated routines and methods can end at any time and need not be performed in their entireties.

Some or all operations of the methods, and/or substantially equivalent operations, can be performed by execution of computer-readable instructions included on a computer-readable storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations discussed herein can be implemented, at least in part, by modules implementing the features disclosed herein and can be a dynamically linked library ("DLL"), a statically linked library, functionality produced by an application programing interface ("API"), a network service, a compiled program, an interpreted program, a script or any other executable set of instructions. Data can be stored in a data structure in one or more memory components. Data can be retrieved from the data structure by addressing links or references to the data structure.

Although the following illustration refers to the components of the FIGS., it can be appreciated that the operations of the routine 300 and the other routines disclosed herein may be also implemented in many other ways. For example, the routine 300 may be implemented, at least in part, by a processor of another remote computer or a local circuit. In addition, one or more of the operations of the routine 300 may alternatively or additionally be implemented, at least in part, by a chipset working alone or in conjunction with other software modules. In the example described below, one or more modules of a computing system can receive and/or process the data disclosed herein. Any service, circuit, or application suitable for providing the disclosed techniques can be used in operations described herein. The operations illustrated in FIGS. 1A-3 can be performed, for example, by the computing device 400 described below with regard to FIG. 4.

The routine 300 begins at operation 302, where the access token broker is executed in the iFrame 106A. The routine 300 then proceeds from operation 302 to operation 304, where the fully trusted application 112 is executed in the iFrame 106B, which is within the iFrame 106A. The routine 300 then proceeds from operation 304 to operation 306, where the partially trusted application 114 is executed in the iFrame 106C, which is within the iFrame 106B.

From operation 306, the routine proceeds to operation 308, where the access token broker 108 receives an access token request 110 from the fully trusted application 112 or the partially trusted application 114. The routine 300 then proceeds from operation 308 to operation 310, where the access token broker 108 determines whether the received access token request 110 is to be granted. As discussed above, for example, the access token broker 108 may determine whether the access token request 110 is for an access token 120 for an origin that is the same as the origin of the iFrame 106 from which the request 110 was received. If the access token request 110 is for an access token 120 for a different origin than the origin of the iFrame 106 from which the request 110 was received, the access token broker 108 will deny the access token request 110.

If, at operation 310, the access token broker 108 determines that the access token request 110 is for an access token 120 for an origin that is the same as the origin of the iFrame 106 from which the request 110 was received, the access token broker 108 will request the access token 120 from the hosting application 102 at operation 312. As discussed above, the access token broker 108 requests the access token 120 from the hosting application 102 using the JAVASCRIPT postMessage method in some embodiments. The hosting application 102, in turn, obtains the requested access token 120 from the access token server 116 and provides the access token 120 to the access token broker 108.

The access token broker 108 receives the access token 120 from the hosting application 120 at operation 314, and provides the access token 120 to the requesting application (i.e., the fully trusted application 112 or the partially trusted application 114) in response to the access token request 110 received at operation 308. The requesting application can then utilize the received access token 120 to access a network resource. The routine 300 then proceeds from operation 314 to operation 316, where it ends.

Figure 4:
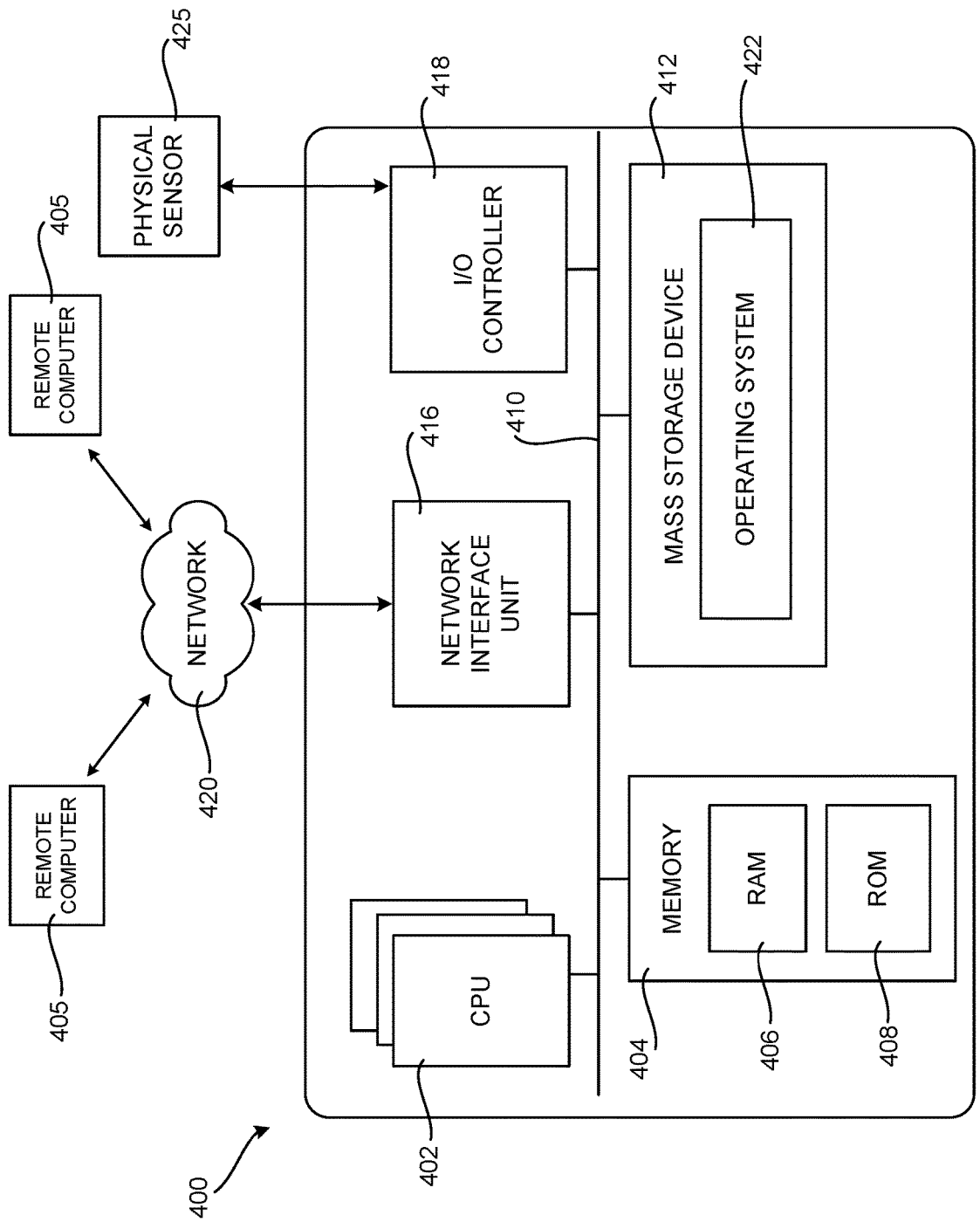
FIG. 4 is a computer architecture diagram showing an illustrative computer hardware and software architecture for a computing device that can implement aspects of the technologies presented herein.

FIG. 4 is a computer architecture diagram showing an illustrative computer hardware and software architecture for a computing device 400 that can implement the various technologies presented herein. In particular, the computer architecture illustrated in FIG. 4 can be utilized to implement a computer capable of providing the functionality disclosed above with reference to FIGS. 1A-3.

The computer 400 illustrated in FIG. 4 includes one or more central processing units 402 ("CPU"), a system memory 404, including a random-access memory 406 ("RAM") and a read-only memory ("ROM") 408, and a system bus 410 that couples the memory 404 to the CPU 402. A basic input/output system ("BIOS" or "firmware") containing the basic routines that help to transfer information between elements within the computer 400, such as during startup, can be stored in the ROM 408.

The computer 400 further includes a mass storage device 412 for storing an operating system 422, application programs such as the hosting application 102, and other types of programs. In one embodiment, an application program, or programs, executing on the computer 400 provides the functionality described above with regard to FIGS. 1A-3. Other modules or program components can provide this functionality in other embodiments. The mass storage device 412 can also be configured to store other types of programs and data.

The mass storage device 412 is connected to the CPU 402 through a mass storage controller (not shown) connected to the bus 410. The mass storage device 412 and its associated computer readable media provide non-volatile storage for the computer 400. Although the description of computer readable media contained herein refers to a mass storage device, such as a hard disk, CD-ROM drive, DVD-ROM drive, or USB storage key, it should be appreciated by those skilled in the art that computer readable media can be any available computer-readable storage media or communication media that can be accessed by the computer 400.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media can include volatile and non-volatile, removable and non-removable media implemented in any method or technology for storage of information such as computer readable instructions, data structures, program modules or other data. For example, computer-readable storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 400. For purposes of the claims, the phrase "computer-readable storage medium," and variations thereof, does not include waves or signals per se or communication media.

According to various configurations, the computer 400 can operate in a networked environment using logical connections to remote computers 405 through a network such as the network 420. The computer 400 can connect to the network 420 through a network interface unit 416 connected to the bus 410. It should be appreciated that the network interface unit 416 can also be utilized to connect to other types of networks and remote computer systems.

The computer 400 can also include an input/output controller 418 for receiving and processing input from a number of other devices, including a keyboard, mouse, touch input, an electronic stylus (not shown in FIG. 4), or a physical sensor 425 such as a video camera. Similarly, the input/output controller 418 can provide output to a display screen or other type of output device (also not shown in FIG. 4).

It should be appreciated that the software components described herein, when loaded into the CPU 402 and executed, can transform the CPU 402 and the overall computer 400 from a general-purpose computing device into a special-purpose computing device customized to facilitate the functionality presented herein. The CPU 402 can be constructed from any number of transistors or other discrete circuit elements, which can individually or collectively assume any number of states.

More specifically, the CPU 402 can operate as a finite-state machine, in response to executable instructions contained within the software modules disclosed herein. These computer-executable instructions can transform the CPU 402 by specifying how the CPU 402 transitions between states, thereby transforming the transistors or other discrete hardware elements constituting the CPU 402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the architecture shown in FIG. 4 for the computer 400, or a similar architecture, can be utilized to implement other types of computing devices, including hand-held computers, video game devices, embedded computer systems, mobile devices such as smartphones, tablets, alternate reality ("AR") and virtual reality ("VR") devices, and other types of computing devices known to those skilled in the art. It is also contemplated that the computer 400 might not include all of the components shown in FIG. 4, can include other components that are not explicitly shown in FIG. 4, or can utilize an architecture completely different than that shown in FIG. 4.

Figure 5:
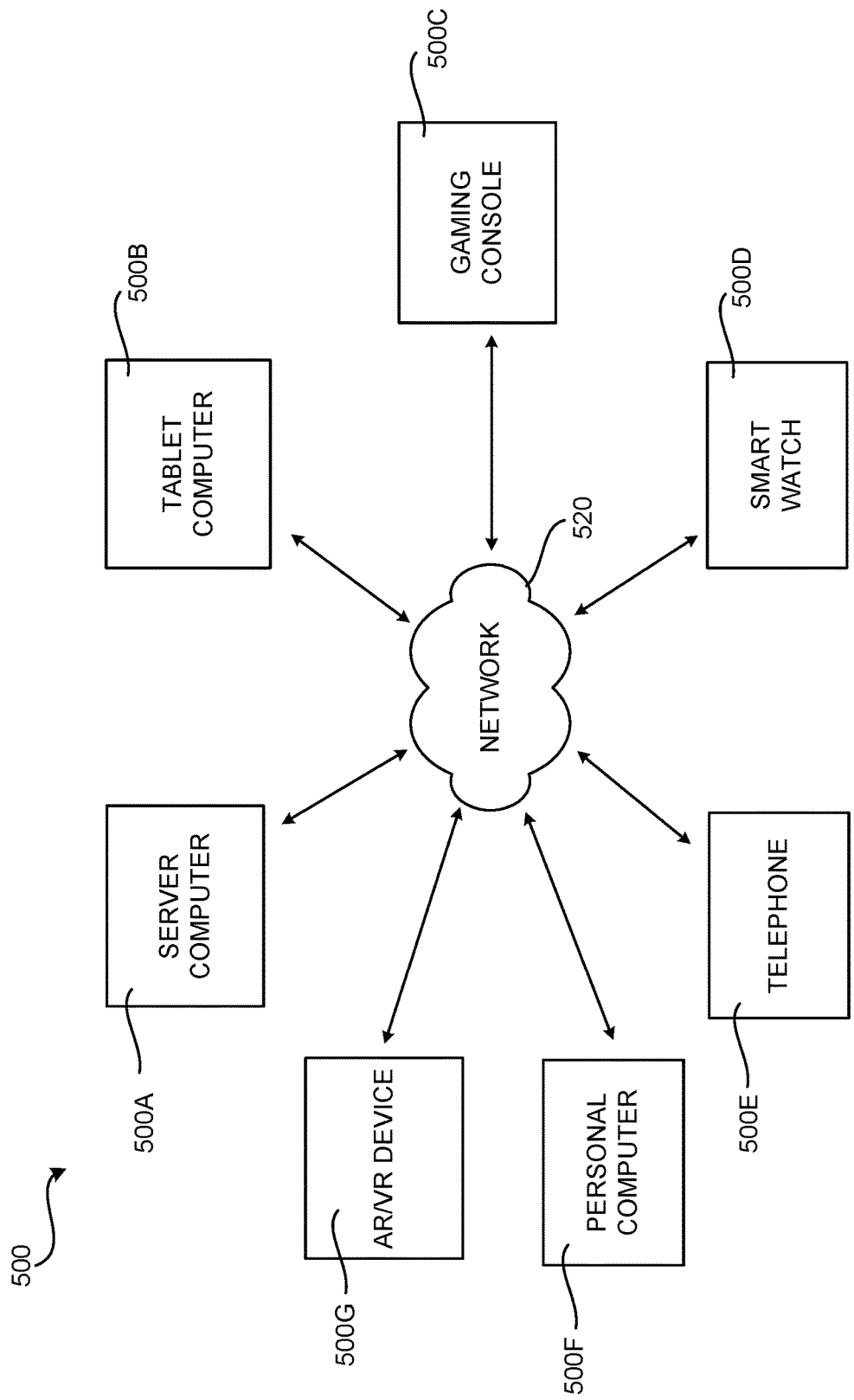
FIG. 5 is a network diagram illustrating a distributed computing environment in which aspects of the disclosed technologies can be implemented.

FIG. 5 is a network diagram illustrating a distributed network computing environment 500 in which aspects of the disclosed technologies can be implemented, according to various embodiments presented herein. As shown in FIG. 5, one or more server computers 500A can be interconnected via a communications network 520 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 500B, a gaming console 500C, a smart watch 500D, a telephone 500E, such as a smartphone, a personal computer 500F, and an AR/VR device 500G.

In a network environment in which the communications network 520 is the Internet, for example, the server computer 500A can be a dedicated server computer operable to process and communicate data to and from the client computing devices 500B-500G via any of a number of known protocols, such as, HTTP, file transfer protocol ("FTP"), or simple object access protocol ("SOAP"). Additionally, the network computing environment 500 can utilize various data security protocols such as secured socket layer ("SSL") or pretty good privacy ("PGP"). Each of the client computing devices 500B-500G can be equipped with an operating system operable to support one or more computing applications or terminal sessions such as a web browser (not shown in FIG. 5), or other graphical UI, including those illustrated above, or a mobile desktop environment (not shown in FIG. 5) to gain access to the server computer 500A.

The server computer 500A can be communicatively coupled to other computing environments (not shown in FIG. 5) and receive data regarding a participating user's interactions/resource network. In an illustrative operation, a user (not shown in FIG. 5) may interact with a computing application running on a client computing device 500B-500G to obtain desired data and/or perform other computing applications.

The data and/or computing applications may be stored on the server 500A, or servers 500A, and communicated to cooperating users through the client computing devices 500B-500G over an exemplary communications network 520. A participating user (not shown in FIG. 5) may request access to specific data and applications housed in whole or in part on the server computer 500A. These data may be communicated between the client computing devices 500B-500G and the server computer 500A for processing and storage.

The server computer 500A can host computing applications, processes, applets, or other types of executable program code for the generation, access, encryption, and communication of data and applications such as those described above with regard to FIGS. 1A-3, and may cooperate with other server computing environments (not shown in FIG. 5), third party service providers (not shown in FIG. 5), and network attached storage ("NAS") and storage area networks ("SAN") to realize application/data transactions.

It should be appreciated that the computing architecture shown in FIG. 4 and the distributed network computing environment shown in FIG. 5 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: executing an access token broker within a first iFrame, the first iFrame associated with a first origin; executing a fully trusted application in a second iFrame within the first iFrame, the second iFrame associated with a second origin different from the first origin; executing a partially trusted application in a third iFrame within the second iFrame, the third iFrame associated with a third origin different from the second origin; receiving a request for an access token at the access token broker executing within the first iFrame from the second iFrame or the third iFrame; responsive to receiving the request for the access token at the access token broker, determining, by way of the access token broker, whether the request for the access token is to be granted; and responsive to determining that the request for the access token is to be granted, requesting the access token from an application hosting the first iFrame, receiving the access token from the application, and providing the access token in response to the request.

Clause 2. The computer-implemented method of clause 1, wherein determining whether the request for the access token is to be granted comprises determining, by way of the access token broker, whether the request is for an access token for an origin that is the same as an origin of the iFrame from which the request was received.

Clause 3. The computer-implemented method of any of clauses 1 or 2, wherein the partially trusted application is configured to identify the first iFrame executing the access token broker by: transmitting a first broker identification message to the first iFrame; transmitting a second broker identification message to the second iFrame; receiving a response to the first broker identification message or the second broker identification message; and identifying the first iFrame executing the access token broker based on the response to the first broker identification message or the second broker identification message.

Clause 4. The computer-implemented method of any of clauses 1-3, wherein the first broker identification message and the second broker identification message are transmitted to the first iFrame and the second iFrame via a postMessage method.

Clause 5. The computer-implemented method of any of clauses 1-4, wherein the access token broker requests the access token from the application hosting the first iFrame via a postMessage method.

Clause 6. The computer-implemented method of any of clauses 1-5, wherein the access token broker receives the access token from the application hosting the first iFrame and provides the access token in response to the request via a postMessage method.

Clause 7. The computer-implemented method of any of clauses 1-6, wherein application hosting the first iFrame comprises a conferencing application, and wherein the fully trusted application and the partially trusted application comprise a collaboration application.

Clause 8. A computer-readable storage medium having computer-executable instructions stored thereupon which, when executed by a computing device, cause the computing device to: execute an access token broker within a first iFrame, the first iFrame associated with a first origin; execute a fully trusted application in a second iFrame within the first iFrame, the second iFrame associated with a second origin different from the first origin; execute a partially trusted application in a third iFrame within the second iFrame, the third iFrame associated with a third origin different from the second origin; receive a request for an access token at the access token broker executing within the first iFrame from the second iFrame or the third iFrame; responsive to receiving the request for the access token at the access token broker, determine, by way of the access token broker, whether the request for the access token is to be granted; and responsive to determining that the request for the access token is to be granted, request the access token from an application hosting the first iFrame, receive the access token from the application, and provide the access token in response to the request.

Clause 9. The computer-readable storage medium of clause 8, wherein determining whether the request for the access token is to be granted comprises determining, by way of the access token broker, whether the request is for an access token for an origin that is the same as an origin of the iFrame from which the request was received.

Clause 10. The computer-readable storage medium of any of clauses 8 or 9, wherein the partially trusted application is configured to identify the first iFrame executing the access token broker by: transmitting a first broker identification message to the first iFrame; transmitting a second broker identification message to the second iFrame; receiving a response to the first broker identification message or the second broker identification message; and identifying the first iFrame executing the access token broker based on the response to the first broker identification message or the second broker identification message.

Clause 11. The computer-readable storage medium of any of clauses 8-10, wherein the first broker identification message and the second broker identification message are transmitted to the first iFrame and the second iFrame via a postMessage method.

Clause 12. The computer-readable storage medium of any of clauses 8-11, wherein the access token broker requests the access token from the application hosting the first iFrame via a postMessage method.

Clause 13. The computer-readable storage medium of any of clauses 8-12, wherein the access token broker receives the access token from the application hosting the first iFrame and provides the access token in response to the request via a postMessage method.

Clause 14. The computer-readable storage medium of any of clauses 8-13, wherein application hosting the first iFrame comprises a conferencing application, and wherein the fully trusted application and the partially trusted application comprise a collaboration application.

Clause 15. A computing device, comprising: at least one processor; and a computer-readable storage medium having computer-executable instructions stored thereupon which, when executed by the at least one processor, cause the computing device to: execute an access token broker within a first iFrame, the first iFrame associated with a first origin; execute a fully trusted application in a second iFrame within the first iFrame, the second iFrame associated with a second origin different from the first origin; execute a partially trusted application in a third iFrame within the second iFrame, the third iFrame associated with a third origin different from the second origin; receive a request for an access token at the access token broker executing within the first iFrame from the second iFrame or the third iFrame; responsive to receiving the request for the access token at the access token broker, determine, by way of the access token broker, whether the request for the access token is to be granted; and responsive to determining that the request for the access token is to be granted, request the access token from an application hosting the first iFrame, receive the access token from the application, and provide the access token in response to the request.

Clause 16. The computing device of clause 15, wherein determining whether the request for the access token is to be granted comprises determining, by way of the access token broker, whether the request is for an access token for an origin that is the same as an origin of the iFrame from which the request was received.

Clause 17. The computing device of any of clauses 15 or 6, wherein the partially trusted application is configured to identify the first iFrame executing the access token broker by: transmitting a first broker identification message to the first iFrame; transmitting a second broker identification message to the second iFrame; receiving a response to the first broker identification message or the second broker identification message; and identifying the first iFrame executing the access token broker based on the response to the first broker identification message or the second broker identification message.

Clause 18. The computing device of any of clauses 15-17, wherein the first broker identification message and the second broker identification message are transmitted to the first iFrame and the second iFrame via a postMessage method.

Clause 19. The computing device of any of clauses 15-18, wherein the access token broker requests the access token from the application hosting the first iFrame via a postMessage method.

Clause 20. The computing device of any of clauses 15-19, wherein the access token broker receives the access token from the application hosting the first iFrame and provides the access token in response to the request via a postMessage method.

Based on the foregoing, it should be appreciated that technologies for securely brokering access tokens to partially trusted code have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
executing an access token broker within a first iFrame, the first iFrame associated with a first origin;
executing a fully trusted application in a second iFrame within the first iFrame, the second iFrame associated with a second origin different from the first origin;
executing a partially trusted application in a third iFrame within the second iFrame, the third iFrame associated with a third origin different from the second origin;
receiving a request for an access token at the access token broker executing within the first iFrame from the second iFrame or the third iFrame;
responsive to receiving the request for the access token at the access token broker, determining, by way of the access token broker, whether the request for the access token is to be granted; and
responsive to determining that the request for the access token is to be granted,
requesting the access token from an application hosting the first iFrame,
receiving the access token from the application, and
providing the access token in response to the request.

2. The computer-implemented method of claim 1, wherein determining whether the request for the access token is to be granted comprises determining, by way of the access token broker, whether the request is for an access token for an origin that is the same as an origin of the iFrame from which the request was received.

3. The computer-implemented method of claim 1, wherein the partially trusted application is configured to identify the first iFrame executing the access token broker by:
transmitting a first broker identification message to the first iFrame;
transmitting a second broker identification message to the second iFrame;

receiving a response to the first broker identification message or the second broker identification message; and identifying the first iFrame executing the access token broker based on the response to the first broker identification message or the second broker identification message.

4. The computer-implemented method of claim 3, wherein the first broker identification message and the second broker identification message are transmitted to the first iFrame and the second iFrame via a postMessage method.

5. The computer-implemented method of claim 3, wherein the access token broker requests the access token from the application hosting the first iFrame via a postMessage method.

6. The computer-implemented method of claim 3, wherein the access token broker receives the access token from the application hosting the first iFrame and provides the access token in response to the request via a postMessage method.

7. The computer-implemented method of claim 1, wherein the application hosting the first iFrame comprises a conferencing application, and wherein the fully trusted application and the partially trusted application comprise a collaboration application.

8. A computer-readable storage medium having computer-executable instructions stored thereupon which, when executed by a computing device, cause the computing device to:

execute an access token broker within a first iFrame, the first iFrame associated with a first origin;

execute a fully trusted application in a second iFrame within the first iFrame, the second iFrame associated with a second origin different from the first origin;

execute a partially trusted application in a third iFrame within the second iFrame, the third iFrame associated with a third origin different from the second origin;

receive a request for an access token at the access token broker executing within the first iFrame from the second iFrame or the third iFrame;

responsive to receiving the request for the access token at the access token broker, determine, by way of the access token broker, whether the request for the access token is to be granted; and responsive to determining that the request for the access token is to be granted, request the access token from an application hosting the first iFrame, receive the access token from the application, and provide the access token in response to the request.

9. The computer-readable storage medium of claim 8, wherein determining whether the request for the access token is to be granted comprises determining, by way of the access token broker, whether the request is for an access token for an origin that is the same as an origin of the iFrame from which the request was received.

10. The computer-readable storage medium of claim 8, wherein the partially trusted application is configured to identify the first iFrame executing the access token broker by:

transmitting a first broker identification message to the first iFrame;

transmitting a second broker identification message to the second iFrame;

receiving a response to the first broker identification message or the second broker identification message; and identifying the first iFrame executing the access token broker based on the response to the first broker identification message or the second broker identification message.

11. The computer-readable storage medium of claim 10, wherein the first broker identification message and the second broker identification message are transmitted to the first iFrame and the second iFrame via a postMessage method.

12. The computer-readable storage medium of claim 10, wherein the access token broker requests the access token from the application hosting the first iFrame via a postMessage method.

13. The computer-readable storage medium of claim 10, wherein the access token broker receives the access token from the application hosting the first iFrame and provides the access token in response to the request via a postMessage method.

14. The computer-readable storage medium of claim 8, wherein the application hosting the first iFrame comprises a conferencing application, and wherein the fully trusted application and the partially trusted application comprise a collaboration application.

15. A computing device, comprising:

at least one processor; and a computer-readable storage medium having computer-executable instructions stored thereupon which, when executed by the at least one processor, cause the computing device to:

execute an access token broker within a first iFrame, the first iFrame associated with a first origin;

execute a fully trusted application in a second iFrame within the first iFrame, the second iFrame associated with a second origin different from the first origin;

execute a partially trusted application in a third iFrame within the second iFrame, the third iFrame associated with a third origin different from the second origin;

receive a request for an access token at the access token broker executing within the first iFrame from the second iFrame or the third iFrame;

responsive to receiving the request for the access token at the access token broker, determine, by way of the access token broker, whether the request for the access token is to be granted; and responsive to determining that the request for the access token is to be granted, request the access token from an application hosting the first iFrame, receive the access token from the application, and provide the access token in response to the request.

16. The computing device of claim 15, wherein determining whether the request for the access token is to be granted comprises determining, by way of the access token broker, whether the request is for an access token for an origin that is the same as an origin of the iFrame from which the request was received.

17. The computing device of claim 16, wherein the partially trusted application is configured to identify the first iFrame executing the access token broker by:

transmitting a first broker identification message to the first iFrame;

transmitting a second broker identification message to the second iFrame;

receiving a response to the first broker identification message or the second broker identification message; and identifying the first iFrame executing the access token broker based on the response to the first broker identification message or the second broker identification message.

18. The computing device of claim 17, wherein the first broker identification message and the second broker identification message are transmitted to the first iFrame and the second iFrame via a postMessage method.

19. The computing device of claim 17, wherein the access token broker requests the access token from the application hosting the first iFrame via a postMessage method.

20. The computing device of claim 17, wherein the access token broker receives the access token from the application hosting the first iFrame and provides the access token in response to the request via a postMessage method.

* * * * *